United States Patent [19]
Goolsbay et al.

[11] Patent Number: 5,401,286
[45] Date of Patent: Mar. 28, 1995

[54] METHOD AND APPARATUS FOR SHAPING SHEETS

[75] Inventors: Dennis M. Goolsbay, Evansville; Larry W. Deffendoll, Boonville; Patrick L. Singleton, Wadesville, all of Ind.

[73] Assignee: PPG Industries, Inc., Pittsburgh, Pa.

[21] Appl. No.: 150,892

[22] Filed: Nov. 12, 1993

[51] Int. Cl.⁶ ............................................. C03B 23/03
[52] U.S. Cl. ................................. 65/106; 65/273; 65/287; 65/289
[58] Field of Search ................ 65/106, 273, 287, 289

[56] References Cited

U.S. PATENT DOCUMENTS

| | | | |
|---|---|---|---|
| 4,556,407 | 12/1985 | Fecik et al. | 65/289 |
| 4,579,577 | 4/1986 | Claassen | 65/273 |
| 4,830,650 | 5/1989 | Kelly | 65/106 |
| 4,904,294 | 2/1990 | Schultz et al. | 65/106 |

Primary Examiner—Joye L. Woodard
Attorney, Agent, or Firm—Andrew C. Siminerio

[57] ABSTRACT

A flexible ring mold for shaping heat softened glass sheets is provided with an inner ring having a plurality of posts which help support the ring mold and maintain the mold's generally planar configuration during the initial lifting and shaping of a supported glass sheet. Prior to the entire glass sheet being pressed against an upper mold surface, the ring mold is separated from the support posts.

19 Claims, 4 Drawing Sheets

METHOD AND APPARATUS FOR SHAPING SHEETS

BACKGROUND OF THE INVENTION

This invention relates to shaping of heat softened sheet material, and in particular to shaping heat softened glass sheets between an upper mold and a lower flexible ring mold.

Shaped and tempered glass sheets are widely used as windows in vehicles such as automobiles and the like. To fabricate these windows, flat glass sheets must be shaped to precisely defined curvatures dictated by the shape and outline of the window frame openings in the vehicle. It is important that the windows meet stringent optical requirements and be free of optical defects that would tend to interfere with clear viewing through the window. Any distortion in the shaping members that engage the heat softened sheet is replicated in the major surface of the sheet and result in an optically deficient surface on the shaped sheet.

Commercial production of shaped glass sheets commonly includes heating flat glass sheets to their softening temperature, shaping the heated sheets to a desired curvature and then cooling the shaped glass sheets in a controlled manner. In particular, the glass sheets are serially conveyed to a tunnel type furnace and heated to their heat deformation temperature and thereafter conveyed into a shaping station where the heat softened sheets are sandwiched between a pair of vertically, aligned upper and lower shaping molds. After shaping, the molds separate with the shaped glass sheet remaining engaged by the upper mold by vacuum. A transfer ring having an outline shape and conforming to the desired curvature of the glass sheet slightly inboard of its perimeter moves beneath the upper mold which thereafter releases the vacuum and deposits the shaped glass on the ring. The ring then transfers the shaped glass sheet into the cooling station for tempering.

The lower mold in such sheet shaping arrangement is generally positioned below the conveying rolls in the shaping station and may include a flexible shaping ring as disclosed in U.S. Pat. No. 4,830,650 to Kelly. During shaping, the lower mold moves upward and lifts the glass sheet off the conveying rolls and into engagement with the upper mold. As the flexible ring lifts the glass sheet and presses it against the upper mold, the flexible ring conforms to corresponding portions of the upper mold. It has been found that during the initial rapid upper movement of the lower ring, the ring tends to deform downward prior to the glass engaging the upper mold, due in part to the acceleration of the ring and the weight of the supported glass sheet. The shape assumed by the glass may not correspond to the final desired shape. This may result in some sliding of the glass sheet and marking as it is lifted by the ring and pressed against the upper mold.

It would be advantageous to provide an arrangement that limits the flexible ring deflection during lifting of the glass but does not interfere with the pressing and flexing operation of the ring.

SUMMARY OF THE INVENTION

The present invention provides an apparatus and method for shaping heat softened sheet material including an upper mold having a sheet engaging surface generally corresponding to the final desired contours of the sheet to be shaped and a lower flexible ring mold with a deformable sheet engaging surface vertically aligned below the upper mold. A plurality of deformable supports are positioned along the deformable surface to support the ring mold. The ring mold is configured such that its deformable surface engages and supports the sheet to be shaped about its periphery. The upper mold and ring mold move relative to each other to progressively bias and press the supported sheet therebetween. During pressing, the ring deforms to conform to a corresponding peripheral portion of the upper mold. The sheet engaging surface of the ring is maintained in a generally planar configuration at least prior to the glass sheet contacting the shaping surface of the upper mold. In one particular embodiment of the invention, a plurality of upwardly extending posts are positioned below the flexible ring mold. The upper ends of the posts terminate at least in close proximity to a lower surface of an inwardly extending portion of the flexible ring mold. The posts are mounted on a support ring and move upward along the ring mold to maintain the ring's generally planar configuration until the glass sheet contact the upper mold. Stop members prevent continued upward movement of the posts while the ring mold continues to move toward the upper mold to complete the pressing operation.

DETAILED DESCRIPTION OF THE INVENTION

The present invention is taught in conjunction with its use in shaping heat softened glass sheets, but is understood that the invention may be used in any type of heat softened sheet material shaping arrangement which utilizes a flexible shaping member.

Figure 1:
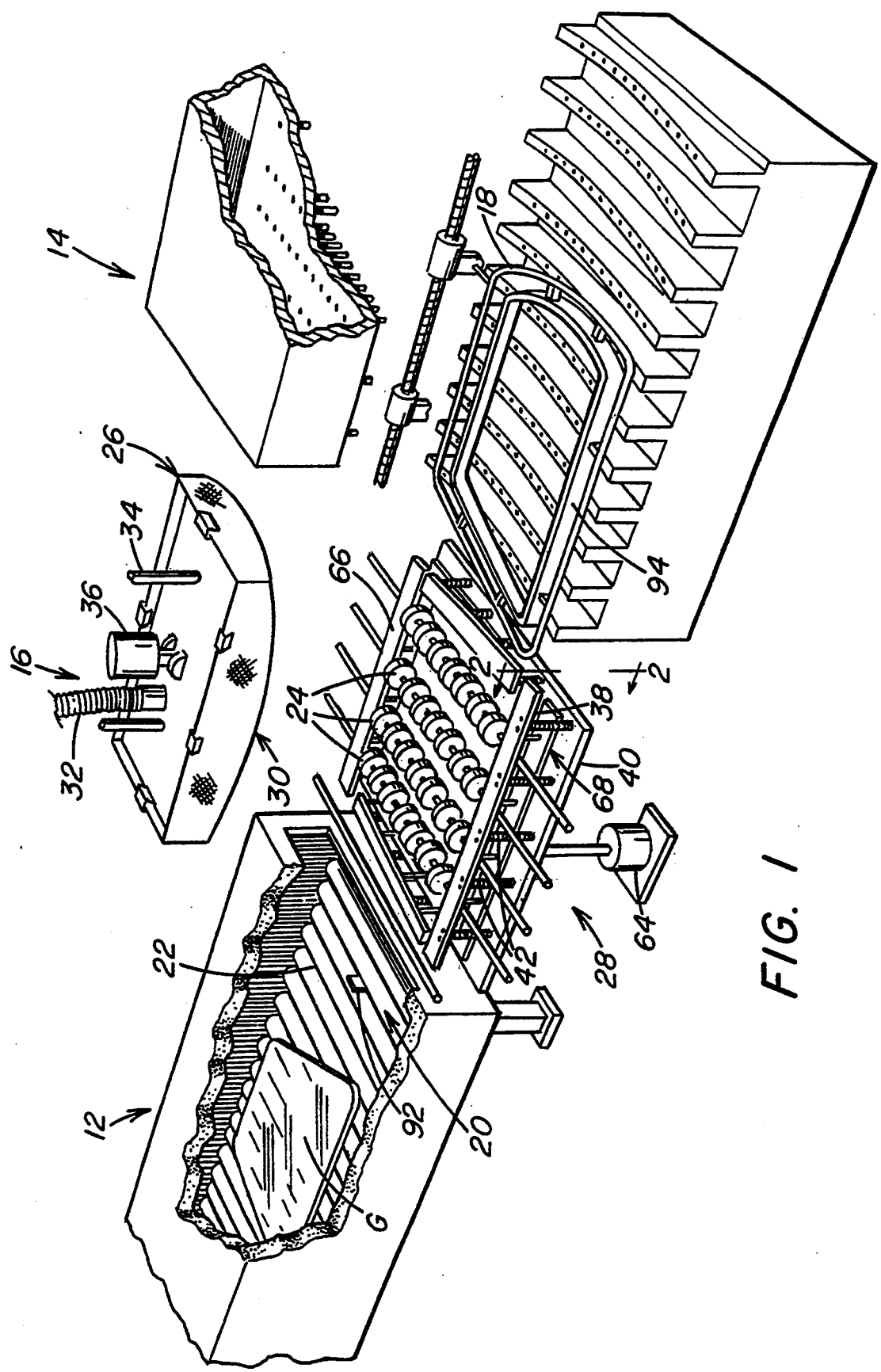
FIG. 1 is a partly fragmentary perspective view looking upstream at a glass sheet bending arrangement incorporating the teachings of the present invention.

Referring to FIG. 1, an apparatus for treating and shaping sheets of heat softened materials such as glass, includes a furnace 12 through which the glass sheets G are serially conveyed from a loading station (not shown) to heat each sheet to its deformation temperature. A cooling station 14 for cooling the shaped sheets and an unloading zone (not shown) beyond the cooling station 14 are located in an end to end relation downstream from the furnace 12. An intermediate shaping station 16 is disposed between the furnace 12 and cooling station 14. A sheet transfer means 18 located at the cooling station 14 transfers the shaped and tempered glass sheet downstream for transfer to the unloading station.

The furnace 12 includes a horizontal conveyor 20 with longitudinally spaced, transversely extending conveyor rolls 22 that define a path of travel which extends through the furnace 12. The rolls 22 in the conveyor 20 are arranged in sections and their rotational speed is controlled through clutches (not shown) so that the speed of each conveyor section may be controlled and synchronized in any convenient manner.

The shaping station 16 includes a series of spaced apart, donut shaped support rolls 24 which support the heat softened glass sheet G as it exits the furnace 12 and enters the shaping station 16 and also includes an upper shaping mold 26 and a lower shaping mold 28. If desired, rolls 24 may be replaced with rolls (not shown) that provide for continuous transverse support of the sheet G within lower shaping mold 28. Although not limiting in the present invention, the upper mold 26 is a vacuum mold similar to that disclosed in U.S. Pat. No. 4,579,577. The shaping surface 30 of the mold 26 conforms to the final desired shape of the glass sheet G. With continued reference to FIG. 1, the upper vacuum mold 26, which communicates with a vacuum source (not shown) through an evacuation pipe 32 and suitable valve means (not shown), is suitably connected through upper vertical guard rods 34 to a support frame (not shown) and is vertically moveable via a piston arrangement 36 relative to the frame. The evacuation pipe 32 may be connected through a suitable valve arrangement to a source of pressurized air (not shown). The valve for the vacuum line and for the pressure line may be synchronized according to a predetermined time cycle in any convenient manner.

Figure 2:
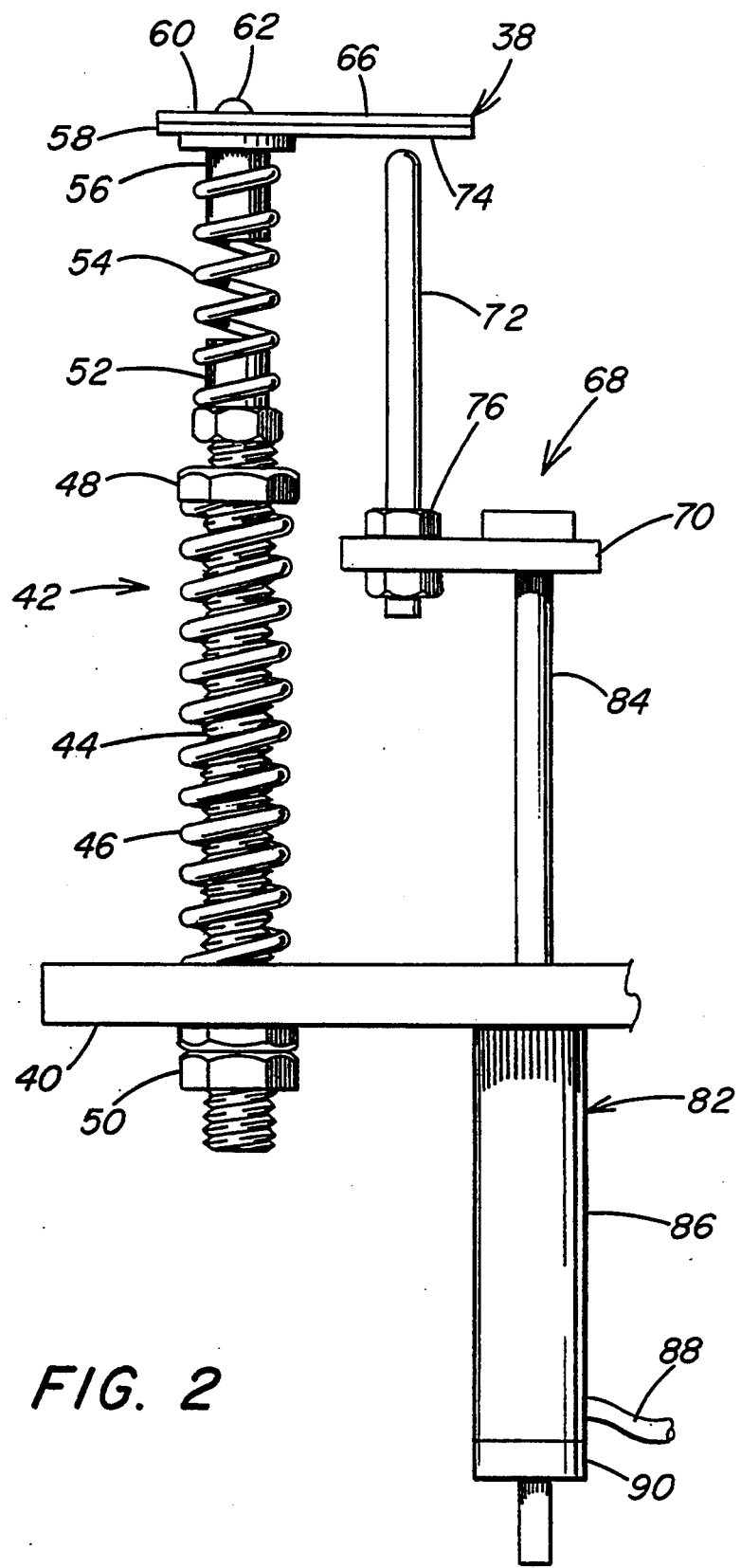
FIG. 2 is an sectional view through line 2—2 of FIG. 1 illustrating a spring mounted flexible shaping ring and an inner lifting ring, which is the object of the present invention, with portions removed for clarity.

The lower mold 28 is similar to that taught in U.S. Pat. No. 4,830,650 and includes a flexible ring 38 that is generally flat when initialing engaging a heat softened glass sheet G and conforms to the peripheral curvature of the upper mold 26 during pressing as will be discussed later in more detail. Referring to FIG. 2, the flexible ring 38 is supported on a mounting plate 40 by compliant support assemblies 42 which include a support bar 44 extending through mounting plate 40 and a main spring 46 captured on bar 44 by an upper nut 48 and lower lock nuts 50. A collar 52 is secured to the upper end of bar 44 in any convenient manner and includes a spiral groove along its surface to engage the lower end of a support spring 54. A collar 56, which is similar to collar 52, engages the upper end of support spring 54 and is secured to flexible support 58 in any convenient manner. Heat resistant board 60 is secured to support 58, for example, by rivets 62 so that as the support 58 and board 60 flex during pressing, they may slide relative to each other.

Support assembly 42 allows the flexible ring 38 to engage and conform to the shaping surface 30 of the upper mold 26. More particularly, support spring 54 operates as a universal joint, i.e. it allows flexible ring 38 to pivot about any axis and adjust to shaping surface 30 of the upper mold. In addition, the main spring 46 has a spring coefficient that is sufficiently stiff to apply pressure to the flexible ring 38 and bend it as it is pressed against the upper mold 26 while remaining flexible enough so as not to mark the peripheral edge of the glass sheet or squeeze it during shaping. Although not limiting in the present invention, it is preferred that support spring 54 be stiffer, i.e. have a higher spring constant than main spring 46 so that the spring 46 will assume more vertical compression than support spring 66 during pressing and support spring 54 will act primarily as a rotating member rather than a vertically compressing member. Various combinations of spring constants have been used successfully without marking the perimeter of the heat softened glass sheet G during the shaping operation. Although not limiting in the present invention, the spring constant for the main spring 46 has varied between 7.5–20 lbs. per inch (1.34–3.58 kilograms per cm) and the spring constant for the support spring 54 has varied between 50–150 lbs. per inch (8.95–26.84 kilograms per cm.).

In addition, the combination of support 58 and board 60 which form ring 38 should be sufficiently rigid to support the heat softened glass sheet G as it is engaged by the lower mold 28, but also sufficiently flexible to conform to the peripheral configuration of the upper mold 26. In one particular embodiment of the invention, support 58 is 0.030 inches spring steel and board 60 is ⅛ inch (0.32 cm) thick Spauldite ® ARK-2 aramid laminate available from Spaulding Fibre Co., Inc. New York. If desired, additional heat resistant materials (not shown), such as fiberglass or metal press cloth, may be used to cover the ring 38.

Mounting plate 40 is secured to an elevator means, which is shown in FIG. 1 as lifting cylinder 64, to vertically reciprocate flexible ring 38 from an initial position, wherein the sheet engaging surface 66 of the flexible ring 38 positioned below the support rolls 24 in the shaping station 16, to a second position above the support rolls 24 to shape the glass sheet as will be discussed later.

To prevent the ring 38 from deforming during its initial upward movement, which is due in part to the compression of springs 46 and/or 54 as they support the weight of the flexible ring 38 and glass sheet G, ring assembly 68 is positioned on mold 28, preferably inboard of the bars 44. Assembly 68 includes a support ring 70 having a plurality of standoff posts 72 extending from ring 70 to a position beneath the inwardly extending portion 74 of ring 38. Posts 72 are sized such that when mold 28 is in a down position prior to lifting of glass sheet G for shaping, the top of post 72 contacts or nearly contacts flexible support 58 of ring 38. If desired, the lower portion of posts 72 may be threaded and locked into place with nuts 76 so the effective length of the posts 72 is adjustable. Stops 78 extend from support frame 80 as shown in FIGS. 3–6 (only one stop 78 is shown) to limit the upward movement of assembly 68 for reasons to be discussed later in more detail.

In one embodiment of the invention, ring 70 is biased in spaced apart relation from plate 40 by double rod air cylinder 82 as shown in FIGS. 2–6 which are available from Bimba Manufacture Co., Monee, Ill. Rod 84 of cylinder 82 is fixed to ring 70 and bottom section 86 of cylinder 82 is fixed to support plate 40. Air is supplied to cylinder 82 through supply line 88 (shown only in FIG. 2) to maintain the spacing between ring 70 and plate 40 during the initial lifting of the glass sheet G during shaping. More specifically, the pressure in cylinder 82 is maintained so as to keep rod 84 fully extended during the initial lifting of the glass so that posts 72 may prevent deformation of the ring 38. Continued pressurization of cylinder 82 also ensures continued contact between ring 70 of assembly 68 and stops 78 during the final pressing and shaping of the glass sheet G against upper mold 26, as will be discussed later in more detail. In one embodiment of the invention, four cylinders 82 are used to space ring 70 from plate 40, one at each corner of plate 40. With this configuration, cylinders 82 also operate as alignment devices to maintain the desired orientation of ring 70 relative to plate 40. Stop 90 is secured to rod 84 below section 86 to control the stroke of rod 84.

Figure 3:
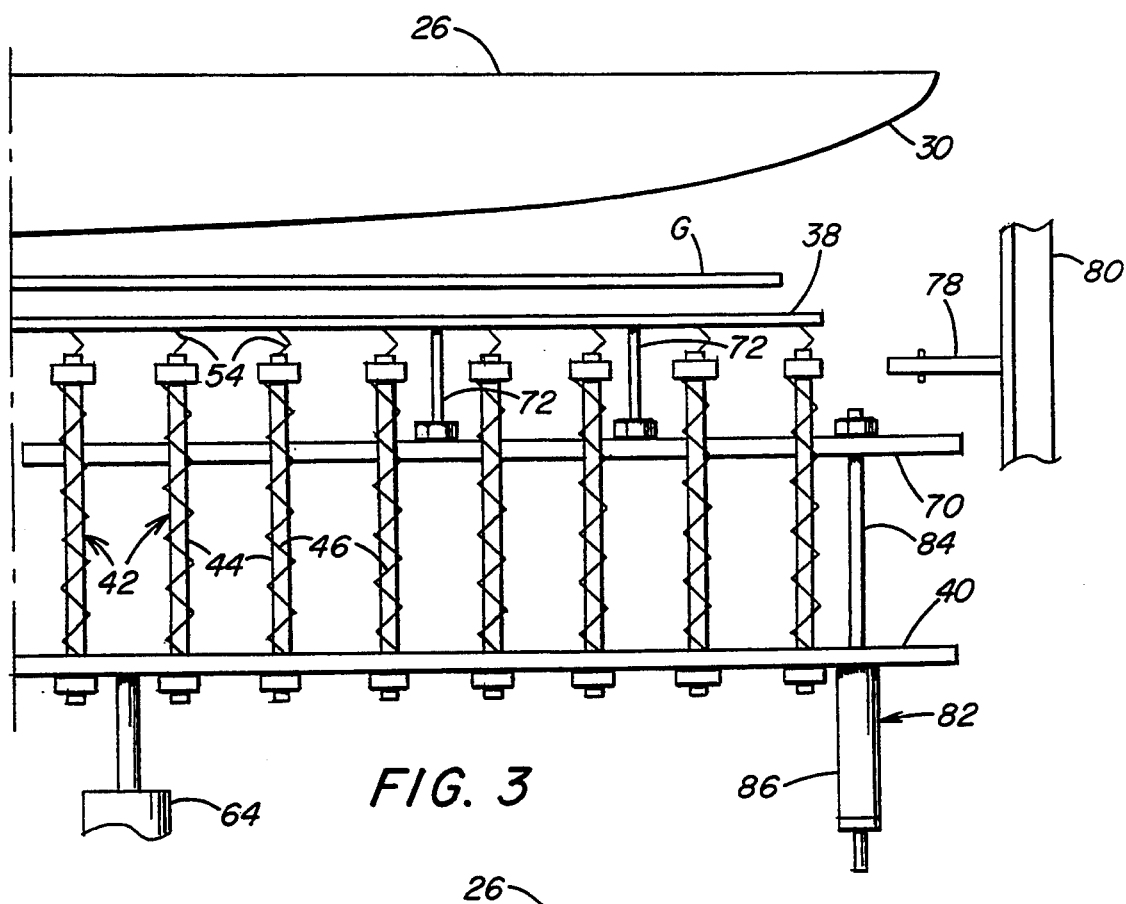
FIGS. 3-6 are schematic elevational views illustrating the operation of the inner lifting ring in combination with the flexible shaping ring during the lifting and pressing of heat softened glass sheets against an upper shaping mold.
Figure 4:
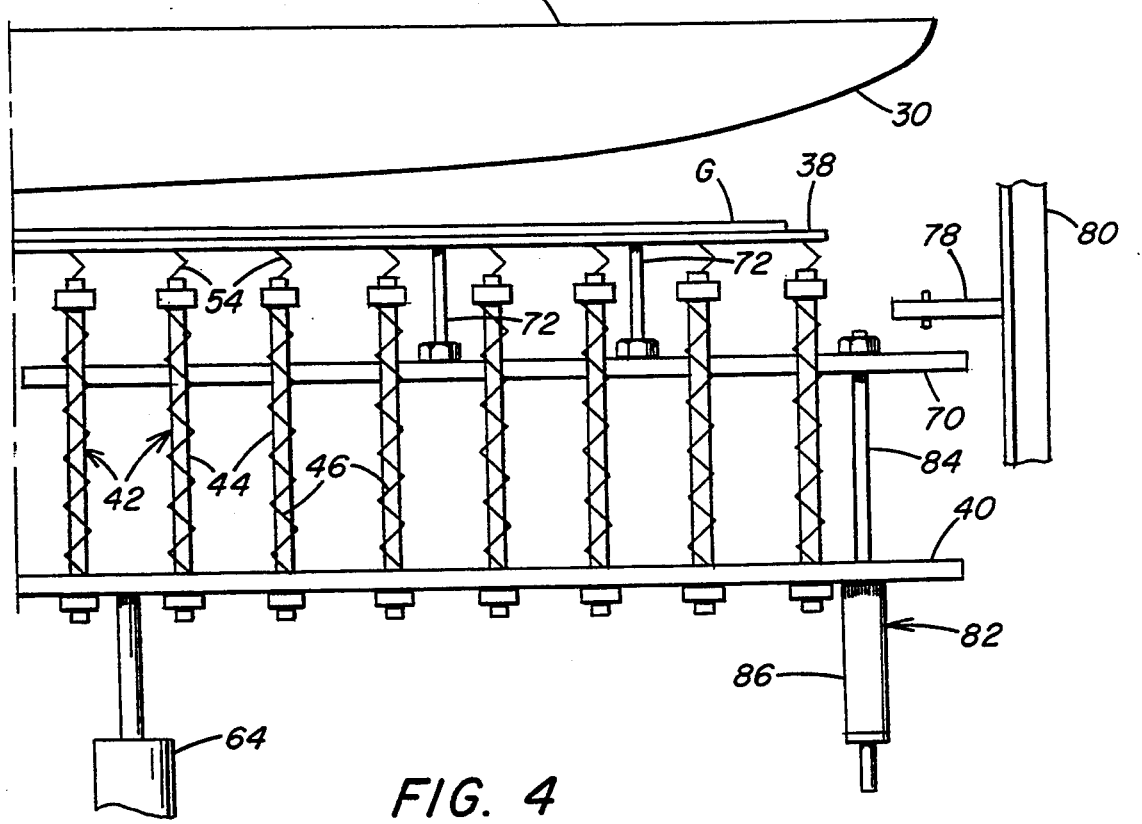

Referring to FIGS. 1 and 3–6, in operation the glass sheet G is conveyed through the furnace 12 to heat the sheet G to its heat softening temperature. Sensor 92 senses the position of the glass sheet G and sends this information to a controller (not shown) which controls the conveying rates of rolls 22 in furnace 12 and rolls 24 in shaping station 16. As the glass sheet G exits the furnace 12 and is conveyed to shaping station 16, the flexible ring 38 of the lower mold 28 is positioned below the upper conveying surface of the support rolls 24 so that the glass may be conveyed therethrough without interference as shown in FIG. 3. When the glass sheet G is in proper position between the upper mold 26 and the lower mold 28, cylinder 64 is activated to rapidly move lower mold 28 upward as shown in FIG. 4, lifting the glass sheet off rolls 24 (rolls 24 are not shown in FIGS. 3–6). With cylinder 82 pressurized to extend rod 84 to its full extent, the upper end of posts 72 are in contact with the bottom of ring 38 and prevent the ring 38 from deforming due to the compression of springs 46 and 54 as mold 28 moves upward. Posts 72 also prevent the downward rotation of ring 38 about springs 54. As a result, as the flexible ring 38 initially contacts the glass sheet G, the ring 38 remains essentially flat so that it simultaneously contacts the entire edge of the glass sheet to be shaped and the periphery of the glass sheet remains flat until it is pressed against the upper mold 26. The lower mold 28 continues to move upward to press the heat softened glass sheet against the upper mold 26.

Figure 5:
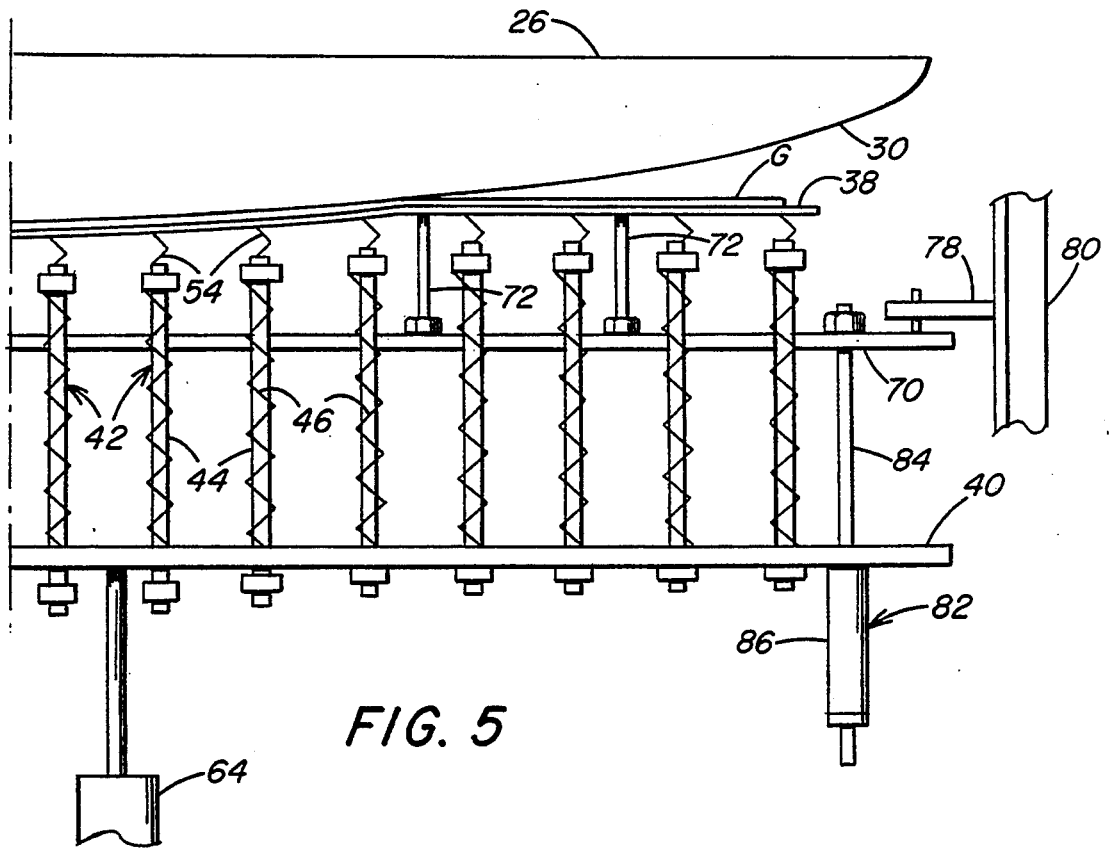
Figure 6:
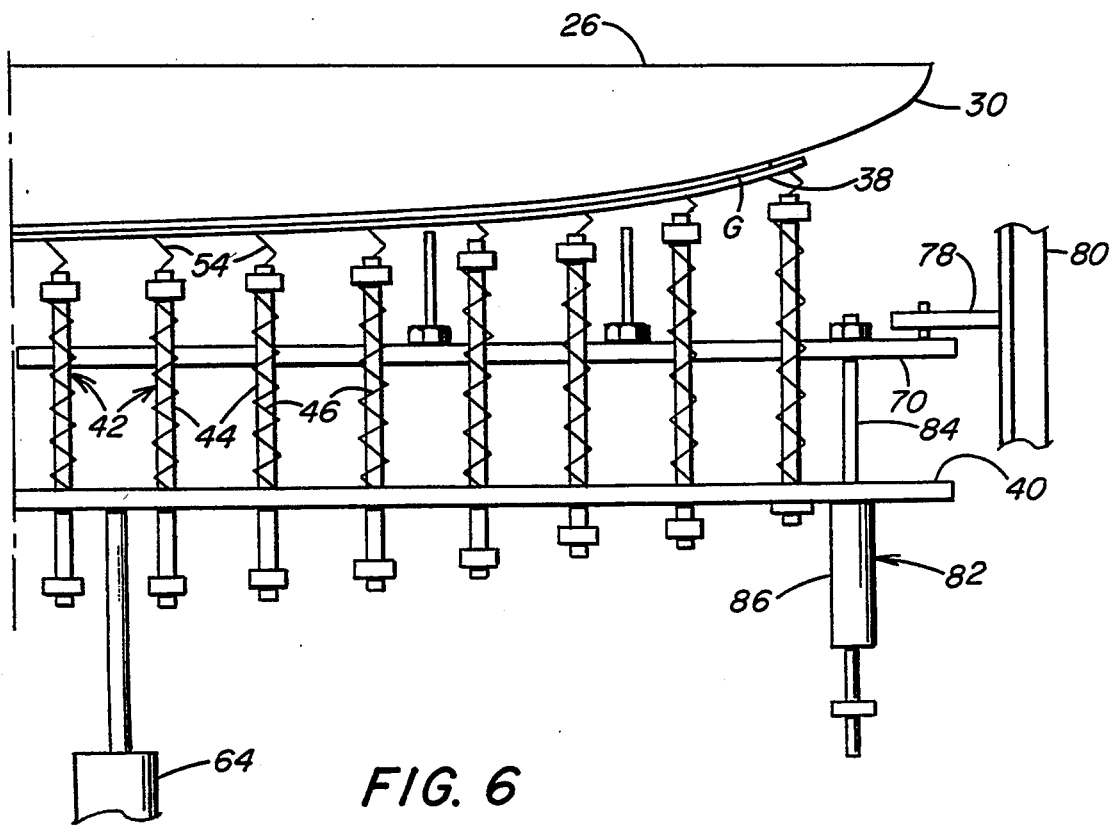

Referring to FIG. 5, as cylinder 64 continues to move mold 28 upward, the glass sheet G on the ring 38 begins to engage the peripheral portions of the shaping surface 30 of the upper mold 26. The main springs 46 will begin to compress and support springs 54 will begin to rotate to conform the ring 38 to the upper mold's shape. The upward movement of ring 70 is limited by the stops 78 which prevent posts 72 from continuing their upward movement. During the upward movement, plate 40, slides along rod 84 of double rod air cylinder 82 so that flexible ring 38 moves away from the posts 72. The pressure in cylinders 82 is maintained to keep ring 70 of assembly 68 in contact with stops 78 but not so great as to prevent the continued upward movement of plate 40 by cylinder 64. If desired, since stops 78 prevent any additional upward movement by ring 70, pressure in cylinder 82 may be terminated. It should be appreciated that the cylinders 82 may be replace by springs (not shown) having a stiffness that is sufficient to maintain the required spacing between plate 40 and ring 70 so that posts 72 maintain flexible ring 38 in a generally flat configuration during the initial lifting and shaping as shown in FIGS. 3, 4, and 5 but may be compressed by cylinder 64 during the final pressing of the glass sheet G as shown in FIG. 6.

As the lower mold 28 continues to press upward, the entire ring 38 moves upward off posts 72 and continues to flex both rotationally and longitudinally and progressively deform so that the peripheral portions of the glass sheet G are pressed against and conform to the corresponding portions of the upper vacuum mold 26. As can be seen in FIG. 6, when the pressing is completed, the ring 38 is completely separated from the standoff posts 72.

It should be appreciated that, depending on the final desired curved configuration of the sheet G, the central portion of the sheet G may contact the central portion of surface 30 of the upper mold 26 before any peripheral portion of the sheet G contacts a corresponding peripheral portion of mold 26. In such an instance, posts 72 and stops 78 may be adjusted so that ring 38 separates and moves away from post 72 (a) when any portion of the sheet G contacts mold 26, (b) when the first peripheral portion of the sheet G contacts the mold 26 or (c) after additional peripheral portions of the sheet G contact mold 26 as shown in FIGS. 5 and 6. More specifically, referring to FIG. 5, it is noted that as the glass sheet G contacts the lowest peripheral portion of the mold 26, other peripheral portions of the sheet G have not contacted the mold 26. Positioning posts 72 below ring 30 at locations spaced from these initial peripheral contact points allows the use of longer posts 72 so that the posts 72 continue to provide flat support for the glass sheet G during the shaping of the sheet G's periphery.

After shaping, the lower mold 28 is lowered and the shaped glass sheet G is held against the upper mold 26 by vacuum. The sheet transfer means 18 such as a tempering ring 94 is then positioned beneath the upper vacuum mold 26 to receive the shaped glass sheet G. The vacuum is then terminated and the glass sheet G is deposited on the tempering ring 94 which thereafter conveys the shaped glass sheet G to the cooling station 14 where the glass sheet G is controllably cooled to a temperature below its strain point temperature to temper the glass.

Other variations as would be known to those skilled in the art based on the disclosure herein may be resorted to without departing from the scope of the invention as defined by the claims that follow.

We claim:

1. A method of shaping heat softened sheet material comprising:
   engaging peripheral portions of a sheet with a ring type mold having a flexible sheet engaging surface;
   moving said ring mold and sheet toward an upper shaping mold;
   contacting and progressively biasing said sheet against a contoured shaping surface of said upper mold while deforming said flexible surface of said ring mold to conform to corresponding peripheral portions of said upper mold; and
   maintaining said ring mold in a generally planar configuration at least during said engaging and moving steps.

2. The method as in claim 1 wherein said maintaining step includes supporting said flexible surface of said ring mold with a plurality of deformable support members secured to a lower surface of said ring mold and contacting an inwardly extending portion of said flexible surface with a plurality of posts positioned inboard of said support members, and further including the step of spacing said posts away from said ring mold prior to completion of said biasing step.

3. The method as in claim 2 wherein said posts are mounted on a support ring positioned below and inboard of said support members and wherein said maintaining step includes the step of holding the distance between said support ring and said ring mold constant during said engaging and moving steps and wherein said spacing step includes the step of increasing said distance between said support ring and said ring mold during at least a portion of said contacting and biasing step.

4. The method as in claim 3 including the step of sustaining contact between said posts and said ring mold at least during said engaging and moving steps.

5. The method as in claim 3 wherein said spacing step includes the step of spacing said posts from said ring mold prior to selected portions of said sheet contacting said upper mold.

6. The method as in claim 3 wherein said spacing step includes the step of spacing said posts from said ring mold prior to selected peripheral portions of said sheet contacting said upper mold.

7. The method as in claim 3 wherein said spacing step includes the step of spacing said posts from said ring mold prior to a portion of said sheet's periphery supported by said ring mold immediately above one of said posts contacting said upper mold.

8. An apparatus for shaping heat softened sheet material comprising:
- an upper mold having a sheet shaping surface generally corresponding to the desired contours of said sheet to be shaped;
- a lower flexible ring mold vertically aligned below said upper mold, said ring mold having a deformable sheet engaging surface;
- a plurality of deformable supports secured to said ring mold;
- means to move said ring mold to engage said sheet, such that said deformable surface supports said sheet about its periphery, and lift said sheet into contact with said sheet shaping surface of said upper mold, such that said sheet is pressed between said ring mold and said upper mold; and
- means to prevent deformation of said sheet engaging surface of said ring mold prior to said sheet contacting said shaping surface of said upper mold.

9. An apparatus for shaping heat softened sheet material comprising:
- an upper mold having a sheet shaping surface generally corresponding to the desired contours of said sheet to be shaped;
- a lower flexible ring mold vertically aligned below said upper mold, said ring mold having a deformable sheet engaging surface;
- a plurality of deformable supports secured to said ring mold;
- means to move said ring mold to engage said sheet, such that said deformable surface supports said sheet about its periphery, and lift said sheet into contact with said sheet shaping surface of said upper mold, such that said sheet is pressed between said ring mold and said upper mold; and
- means to maintain said sheet engaging surface of said ring mold in a generally planar configuration prior to selected portions of said sheet contacting said sheet shaping surface of said upper mold.

10. The apparatus as in claim 9 wherein said flexible ring mold includes an inner portion and an outer portion and said maintaining means includes a support member positioned below said flexible ring mold and having a plurality of upwardly extending posts with upper ends terminating at least in close proximity to a lower surface of said inner portion of said flexible ring mold to support said inner portion and prevent deformation of said sheet engaging surface of said ring mold prior to selected portions of said sheet contacting said sheet shaping surface of said upper mold.

11. The apparatus as in claim 10 further including means to space said posts away from said ring mold when said selected portions of said sheet contact said upper mold.

12. The apparatus as in claim 11 wherein said spacing means is positioned such that said posts are spaced away from said ring mold when a selected portion of said sheet's periphery contact said upper mold.

13. The apparatus as in claim 11 wherein said spacing means is positioned such that said posts are spaced away from said ring mold when a portion of said sheet's periphery supported by said ring mold immediately above one of said posts contacts said upper mold.

14. The apparatus as in claim 11 wherein said posts have a predetermined length measured from said upper end of said posts to said support member and further including means to adjust said length of said posts.

15. The apparatus as in claim 11 wherein said spacing means is positioned such that said posts support said ring mold at locations other than those portions of said ring mold that support a portion of said sheet's periphery which initially contacts said sheet shaping surface of said upper mold.

16. The apparatus as in claim 11 wherein said moving means moves said ring mold and support member upward toward said upper mold and said spacing means includes a stop member positioned to contact said support member and prevent further upward movement of said posts.

17. The apparatus as in claim 16 wherein said deformable supports extend from said ring mold through a mounting plate secured to said moving means, and said support member includes a ring member positioned inboard from said deformable supports and supported from said mounting plate by a connector, with said posts secured to and extending upwardly from said ring member.

18. The apparatus as in claim 17 wherein said connector holds said ring member and said mounting plate apart a constant distance at least prior to said sheet contacting said upper mold.

19. The apparatus as in claim 17 wherein said deformable supports include a plurality of spring members positioned beneath and secured to said ring mold, wherein said spring members allow translational and rotational movement of said deformable surface.

* * * * *